(12) United States Patent
Dudar

(10) Patent No.: US 10,068,485 B2
(45) Date of Patent: Sep. 4, 2018

(54) PLATOONING AUTONOMOUS VEHICLE NAVIGATION SENSORY EXCHANGE

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 158 days.

(21) Appl. No.: 15/236,803

(22) Filed: Aug. 15, 2016

(65) Prior Publication Data

US 2018/0047293 A1   Feb. 15, 2018

(51) Int. Cl.
*G08G 1/00* (2006.01)
*G05D 1/02* (2006.01)
*B60W 30/165* (2012.01)

(52) U.S. Cl.
CPC ............ *G08G 1/22* (2013.01); *B60W 30/165* (2013.01); *G05D 1/0231* (2013.01); *G05D 1/0255* (2013.01); *G05D 1/0257* (2013.01); *G05D 1/0259* (2013.01); *G05D 1/0287* (2013.01); *B60W 2420/403* (2013.01); *B60W 2420/52* (2013.01); *B60W 2420/54* (2013.01); *B60W 2550/20* (2013.01); *B60W 2550/408* (2013.01); *B60W 2600/00* (2013.01)

(58) Field of Classification Search
CPC ...... G08G 1/22; G05D 1/0231; G05D 1/0255; G05D 1/0257; G05D 1/0259; G05D 1/0287; B60W 30/165; B60W 2420/54; B60W 2550/20; B60W 2550/408; B60W 2420/403; B60W 2420/52; B60W 2600/00

USPC ........................................................ 701/1, 23
See application file for complete search history.

(56) References Cited

U.S. PATENT DOCUMENTS

| 4,809,614 A | * | 3/1989 | Theurer | E01B 29/10 |
| | | | | 104/12 |
| 5,781,119 A | | 7/1998 | Yamashita et al. | |
| 6,032,097 A | * | 2/2000 | Iihoshi | G08G 1/22 |
| | | | | 180/168 |
| 6,356,820 B1 | * | 3/2002 | Hashimoto | G08G 1/22 |
| | | | | 180/167 |

(Continued)

FOREIGN PATENT DOCUMENTS

| JP | 2000311300 A | 11/2000 |
| WO | 2016087901 A1 | 6/2016 |

OTHER PUBLICATIONS

Chang, K.S. et al, "Experimentation with a Vehicle Platoon Control System," SAE International, Oct. 1, 1991.

(Continued)

*Primary Examiner* — Jaime Figueroa
(74) *Attorney, Agent, or Firm* — Frank A. MacKenzie; Beijin Bieneman PLC

(57) ABSTRACT

A vehicle system includes a communication interface programmed to communicate with a plurality of platooning vehicles, including a rear vehicle, and receive sensor signals transmitted from the rear vehicle. The vehicle system further includes a processor programmed to command the rear vehicle to turn around and programmed to output control signals to the plurality of platooning vehicles. The control signals control at least one of the plurality platooning vehicles to travel in a reverse direction according to the sensor signals received from the rear vehicle.

17 Claims, 3 Drawing Sheets

(56) References Cited

U.S. PATENT DOCUMENTS

| | | | |
|---|---|---|---|
| 6,580,976 B1* | 6/2003 | Belcea | B60T 7/128 340/988 |
| 7,831,345 B2 | 11/2010 | Heino et al. | |
| 8,352,111 B2 | 1/2013 | Mudalige | |
| 8,620,517 B2* | 12/2013 | Caveney | G05D 1/0295 701/31.5 |
| 8,775,060 B2* | 7/2014 | Solyom | G08G 1/22 180/168 |
| 8,989,995 B2 | 3/2015 | Shida | |
| 9,165,470 B2 | 10/2015 | Mudalige et al. | |
| 9,396,661 B2* | 7/2016 | Okamoto | G08G 1/22 |
| 9,494,944 B2* | 11/2016 | Alam | B60W 30/16 |
| 9,520,064 B2* | 12/2016 | Tsuda | B60W 30/10 |
| 9,632,507 B1* | 4/2017 | Korn | G05D 1/0295 |
| 9,721,474 B2* | 8/2017 | Eskilson | G08G 1/22 |
| 2002/0059017 A1* | 5/2002 | Yamane | G08G 1/0104 701/1 |
| 2010/0049374 A1* | 2/2010 | Ferrin | G05D 1/0227 701/1 |
| 2010/0256836 A1* | 10/2010 | Mudalige | G08G 1/163 701/2 |
| 2014/0246257 A1* | 9/2014 | Jacobsen | B62D 37/04 180/14.2 |
| 2015/0151742 A1 | 6/2015 | Clarke et al. | |
| 2015/0153733 A1 | 6/2015 | Ohmura et al. | |
| 2015/0269845 A1 | 9/2015 | Calmettes et al. | |
| 2016/0171894 A1* | 6/2016 | Harvey | G05D 1/0088 701/23 |

OTHER PUBLICATIONS

Search Report from United Kingdom Intellectual Property Office dated Feb. 1, 2018 regarding GB Application No. 1712836.4 (4 pages).

Pham, et al., "A Unified Nonlinear Controller for a Platoon of Car-Like Vehicles", Proceedings of the American Control Conference, Boston, Massachusetts, Jun. 30-Jul. 2, 2004, IEEE, pp. 2350-2355, vol. 3 (7 pages).

* cited by examiner

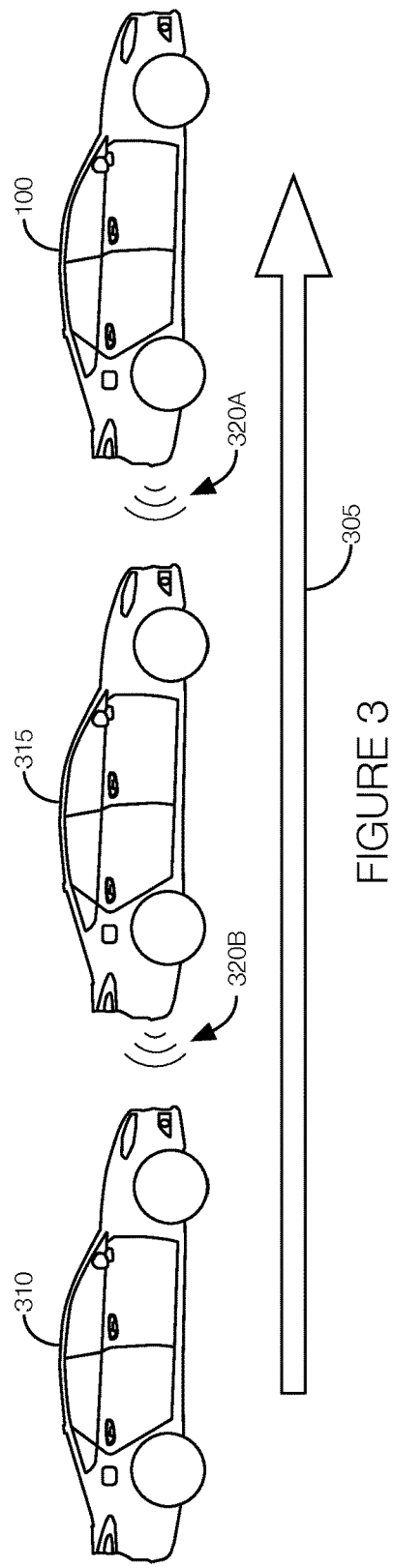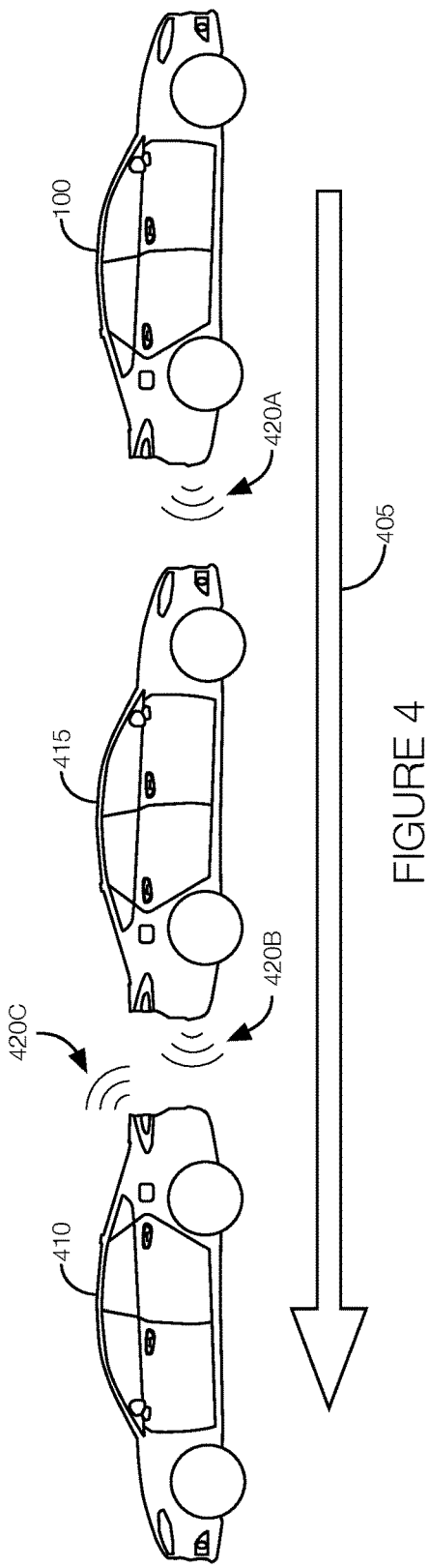

PLATOONING AUTONOMOUS VEHICLE NAVIGATION SENSORY EXCHANGE

BACKGROUND

At a high level, a vehicle platoon is when a group of vehicles follow one another. The lead vehicle is controlled by a human driver or a virtual driver (i.e., in an autonomous mode). The remaining vehicles in the platoon operate in an autonomous or partially autonomous mode to follow the route of the lead vehicle in tandem. Benefits of platooning include greater fuel economy resulting from reduced air resistance, reduced traffic congestion, etc.

BRIEF DESCRIPTION OF THE DRAWINGS

FIG. 3 illustrates platooning vehicles traveling in a forward direction.

FIG. 4 illustrates platooning vehicles traveling in a reverse direction according to control signals output by the vehicle platooning system incorporated into the lead vehicle.

DETAILED DESCRIPTION

Figure 1:
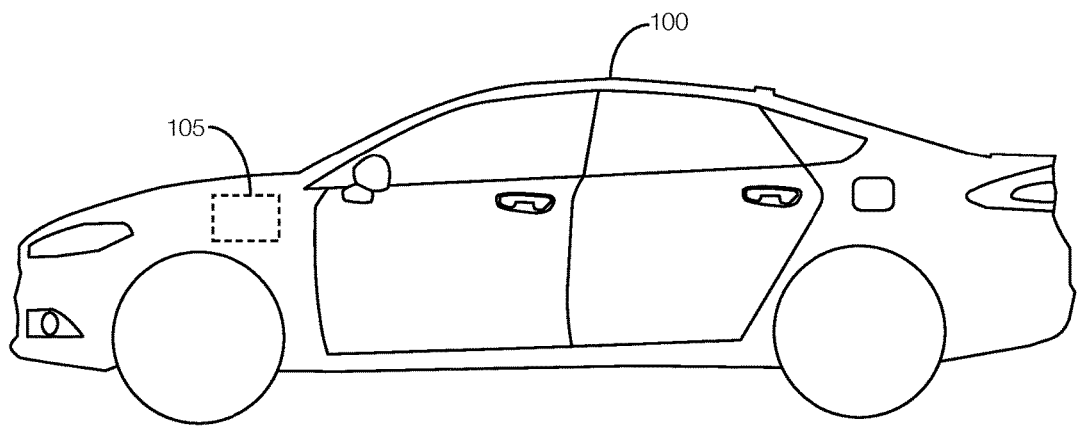
FIG. 1 illustrates an example lead vehicle with a vehicle platooning system for controlling the platoon in a reverse direction.

Platoons are designed to move in one direction, namely a forward direction. That is, all vehicles face the same direction and move in the direction in which they face. Moving a platoon in a reverse direction, however, can be complicated. Vehicles are typically less efficient traveling in reverse. Plus, the sensors relied upon to operate an autonomous vehicle are typically more sophisticated in a forward facing direction than in a rear facing direction.

Nevertheless, sometimes situations arise that require the platoon to move in reverse. For instance, if the platoon comes upon an unanticipated road closure or construction and there is not sufficient room for the vehicles in the platoon to turn around. One way to address that issue is to temporarily disband the platoon and reform the platoon after every vehicle has turned around. There may not be enough room or time to coordinate that type of action, however. Another option is to simply allow the rear vehicle in the platoon to become the temporary lead vehicle while the entire platoon moves in the reverse direction. As noted above, however, the sensors of the rear vehicle may not be sophisticated enough to operate itself and the other vehicles in the platoon in that direction. Further, the rear vehicle may not have the computing power to take on such a task.

Another solution includes a vehicle platooning system, in the lead vehicle, that temporarily moves the entire platoon in the reverse direction using the forward-facing sensors of the rear vehicle and the computing power of the lead vehicle. For example, the vehicle platooning system includes a communication interface programmed to communicate with the platooning vehicles, including the rear vehicle. The communication interface receives sensor signals transmitted from the rear vehicle. The vehicle platooning system further includes a processor programmed to command the rear vehicle to turn around (i.e., face the reverse direction relative to the rest of the platooning vehicles) and further programmed to output control signals to the plurality of platooning vehicles. The control signals control at least one of the plurality platooning vehicles to travel in a reverse direction according to the sensor signals received from the rear vehicle.

With this system, the lead vehicle retains control of the platoon and has the benefits of the forward-facing sensors of the rear vehicle. When the platoon is finished traveling in the reverse direction, the lead vehicle may command the rear vehicle to turn around again (i.e., to face the forward direction relative to the rest of the platooning vehicles) and may continue leading the platoon according to its own sensors.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, a host vehicle 100, which may be the lead vehicle in a platoon, includes a platooning system 105 that transmits control signals to other vehicles in the platoon. The control signals may coordinate the collective movement of the vehicles in the platoon, including causing the platoon to move in a reverse direction. For instance, the platooning system 105 may determine whether the platoon needs to move in the reverse direction. The platooning system 105 may make such a determination if, e.g., the roadway is unexpectedly closed or blocked, the lead vehicle misses a turn, etc. Before deciding whether to reverse the direction of the platoon, the platooning system 105 may determine whether the entire platoon can simply turn around. For instance, the platooning system 105 may determine whether the host vehicle 100 (as the lead vehicle) can perform a U-turn and whether all other vehicles in the platoon can follow that maneuver.

If a U-turn is not possible for the platoon, the platooning system 105 may determine whether the host vehicle 100 should remain the lead vehicle in the platoon or if control of the platoon should be transferred to the rear vehicle. If the rear vehicle is not equipped to control the platoon (e.g., the rear vehicles does not have the computing or communication power to control the platoon), the platooning system 105 may retain control of the platoon. In doing so, the platooning system 105 may instruct the rear vehicle in the platoon to turn around (i.e., face the rearward direction relative to the rest of the vehicles in the platoon) and begin transmitting signals to the host vehicle 100, which may still serve as the lead vehicle despite being at the "back" of the platoon when it moves in the reverse direction. The signals transmitted from the rear vehicle may be from the rear vehicle's forward facing sensors (e.g., one or more of a forward facing LIDAR sensor, a forward facing RADAR sensor, a forward facing ultrasound sensor, or a forward facing camera). Thus, with the platooning system 105, the host vehicle 100 may control the vehicles in the platoon in the reverse direction according to the front-facing sensors of the rear vehicle.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the vehicle is an autonomous vehicle that can operate in an autonomous (e.g., driverless) mode, a partially autonomous mode, and/or a non-autonomous mode.

Figure 2:
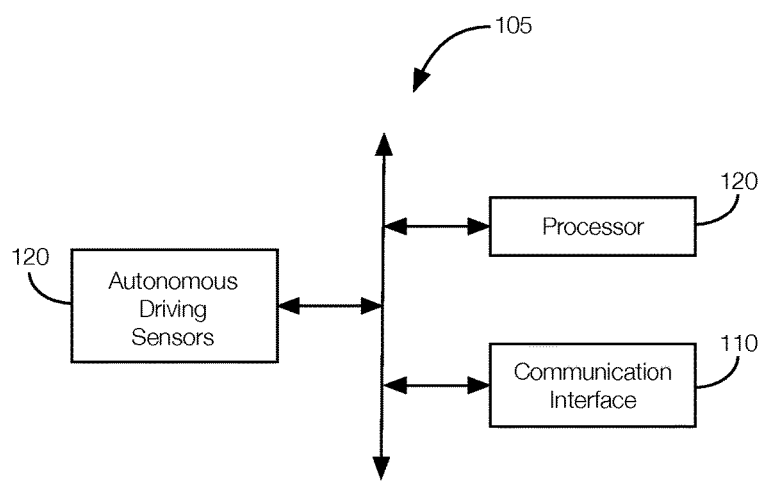
FIG. 2 is a block diagram illustrating example components of the vehicle platooning system.

Referring now to FIG. 2, the platooning system 105 may include or work in combination with a communication interface 110, autonomous driving sensors 115, and a processor 120.

The communication interface 110 is implemented via circuits, chips, or other electronic components that can facilitate wireless communication with other vehicles or infrastructure devices via, e.g., the Dedicated Short-Range Communication (DSRC) protocol. The communication interface 110 may be programmed to wirelessly transmit messages to, and receive messages from, other vehicles and infrastructure devices. The received messages may be transmitted to other components of the host vehicle 100, such as the processor 120. For example, the communication interface 110 may transmit the control signals generated by the processor 120 associated with controlling the vehicles in the platoon, including the rear vehicle. Moreover, the communication interface 110 may receive signals transmitted from other vehicles in the platoon, including the rear vehicle. Examples of such signals include the signals output by the forward facing sensors of the rear vehicle. The control signals may be transmitted according to any number of wireless communication protocols, including DSRC.

The autonomous driving sensors 115 monitor an area around the host vehicle 100 and output signals that can be used to control the host vehicle 100 in an autonomous or partially autonomous mode. Examples of autonomous driving sensors 115 include LIDAR sensors, RADAR sensors, ultrasound sensors, vision sensors (e.g., cameras), or the like. The autonomous driving sensors 115 may sense the area around the host vehicle 100 and identify potential objects. For instance, the autonomous driving sensors 115 may be programmed to detect the roadway, lane markers, traffic control devices, traffic signs, etc. Further, the autonomous driving sensors 115 may be programmed to identify other vehicles, cyclists, pedestrians, or the like. The autonomous driving sensors 115 may output signals representing the various objects detected. The autonomous driving sensors 115 may output signals to, e.g., the processor 120.

The processor 120 is implemented via circuits, chips, or other electronic components that can control certain operations associated with leading a platoon of other vehicles. The processor 120 may be programmed to plan a path of the platoon, determine if the platoon needs to reverse direction, and control the reversal of the direction of the platoon. For instance, if the platoon needs to travel in the reverse direction, the processor 120 may be programmed to temporarily give control of the platoon to the rear vehicle so long as the rear vehicle can establish that it has the computing and communication power to control the platoon in the reverse direction. If not, the processor 120 may be programmed to retain control of the platoon.

If the processor 120 decides to retain control of the platoon, the processor 120 may command the rear vehicle to turn around (i.e., face the reverse direction relative to the other vehicles in the platoon). For instance, the processor 120 may transmit signals, via the communication interface 110, to the rear vehicle commanding the rear vehicle to move from the forward facing direction (relative to the host vehicle 100) to a rear facing direction (relative to the host vehicle 100). After confirming that the rear vehicle is in the rear facing direction, the processor 120 may instruct the rear vehicle to begin transmitting sensor signals from the forward facing sensors of the rear vehicle. The sensor signals received from the rear vehicle may include sensor signals generated by the forward facing LIDAR sensor, RADAR sensor, ultrasound sensor, or camera on the rear vehicle.

Upon receipt and processing of those sensor signals, the processor 120 may be programmed to generate and transmit control signals to the other vehicles in the platoon in accordance with the sensor signals received. The control signals may instruct all vehicles in the platoon, other than the rear vehicle, to travel in the reverse direction relative to the host vehicle 100 despite facing the forward direction. The control signals will further instruct the rear vehicle to travel in the forward direction relative to the rear vehicle. In other words, the rear vehicle will travel in the reverse direction relative to the rest of the platoon, but unlike the other vehicles, the rear vehicle will be facing the reverse direction. Thus, the processor 120 may control the operation of the platoon according to the forward facing sensors of the rear vehicle, and all vehicles in the platoon will move in the same direction although the rear vehicle will be facing a different direction than the other vehicles in the platoon.

FIG. 3 illustrates multiple vehicles traveling in a forward direction 305 in a platoon. The vehicles include the host vehicle 100 (as the lead vehicle), the rear vehicle 310, and another vehicle 315. Although the platoon is shown with only three vehicles, the platoon may have as few as two vehicles (e.g., just the host vehicle 100 and the rear vehicle 310) or a greater number of vehicles. In some instances, the size of the platoon may be significantly greater (e.g., on the order of 25 vehicles or possibly more). As shown in FIG. 3, all of the vehicles are facing the forward direction 305, which is the direction of travel. Further, communication links 320A and 320B are used to communicate information among and between vehicles in the platoon. For instance, the communication link 320A may be used for the host vehicle 100 to communicate with one of the other vehicles 315, which may use the communication link 320B to communicate with the rear vehicle 310. In some instances, the communication link 320A may indicate a broadcast communication from the host vehicle 100. Thus, the communication link 320A may be used to communicate with multiple vehicles in the platoon, including the rear vehicle 310 and other vehicles 315.

FIG. 4 illustrates vehicles in a platoon traveling in a reverse direction 405. The vehicles include the host vehicle 100 (as the lead vehicle), the rear vehicle 410, and another vehicle 415. Although the platoon of FIG. 4 is shown with only three vehicles, the platoon may have as few as two vehicles (e.g., just the host vehicle 100 and the rear vehicle 310) or a greater number of vehicles. In some instances, the size of the platoon may be significantly greater (e.g., on the order of 25 vehicles or possibly more).

In contrast to the platoon shown in FIG. 3, the host vehicle 100 and the other vehicle 415 are facing the forward direction, which is the opposite of the direction of travel 405. The rear vehicle 405 has been instructed to turn around and race the reverse direction 405, which is the direction of travel. This way, the forward-facing sensors of the rear vehicle 410 may be used to sense the area in the direction of travel of the platoon.

As with the platoon of FIG. 3, communication links 420A and 420B are used to communicate information among and between vehicles in the platoon. For instance, the communication link 420A may be used for the host vehicle 100 to communicate with one of the other vehicles 415, which may use the communication link 420B to communicate with the rear vehicle 410. In some instances, the communication link 420A may indicate a broadcast communication from the host vehicle 100. Thus, the communication link 420A may be used to communicate with multiple vehicles in the platoon, including the rear vehicle 410 and other vehicles 415.

FIG. 4 illustrates an additional communication link 420C, which may be used to transmit sensor signals from the rear vehicle 410 to the host vehicle 100. For instance, the sensor signals generated by the forward facing sensors of the rear vehicle 410 may be transmitted to the host vehicle 100 via the communication link 410C. The control signals transmitted by the host vehicle 100 to the other vehicles via, e.g., communication link 420A may be based on the sensor signals received from the rear vehicle 410.

Figure 5:
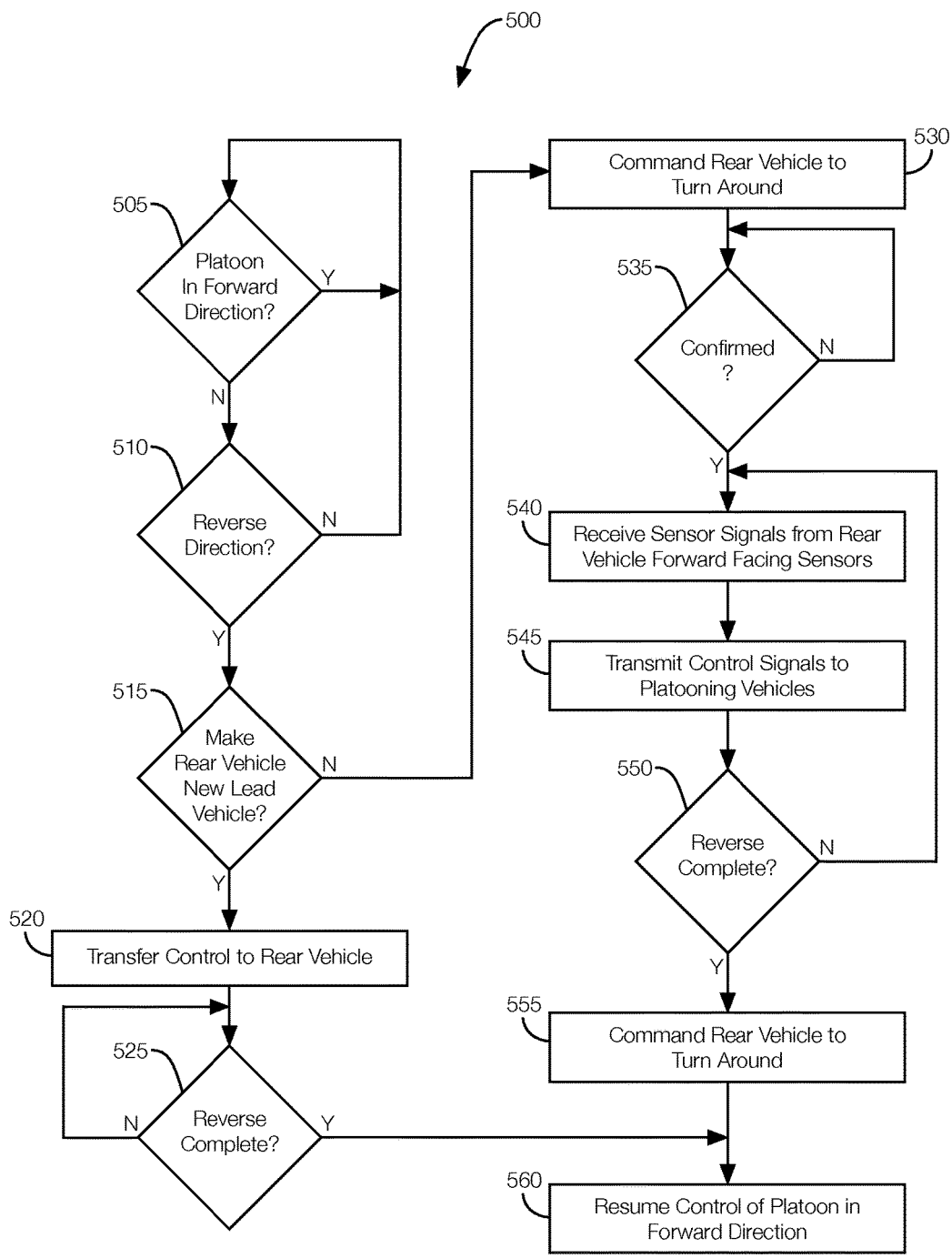
FIG. 5 is a flowchart of an example process that may be executed by the vehicle platooning system to control the platoon to travel in the reverse direction.

FIG. 5 is a flowchart of an example process 500 that may be executed by the vehicle platooning system 105 to control the vehicles in the platoon in the reverse direction. The process 500 may be initiated at any time while the host vehicle 100 is serving as the lead vehicle in the platoon. The process 500 may end when the host vehicle 100 is no longer serving as the lead vehicle in the platoon.

At decision block 505, the vehicle platooning system 105 determines if the platoon is operating in the forward direction. For instance, the processor 120 may monitor signals output by the autonomous driving sensors 115 of the host vehicle 100 to determine whether the platoon should operate in the forward direction. If so, the process 500 repeats block 505 until the platoon needs to stop or move in the reverse direction, at which point the process 500 may proceed to block 510.

At decision block 510, the vehicle platooning system 105 determines if the platoon needs to move in the reverse direction. For instance, the processor 120 may determine that the platoon needs to move in the reverse direction based on signals output by the autonomous driving sensors 115 indicating, e.g., something blocking the roadway that the platoon is unable to go around, a missed turn, etc. If the processor 120 determines that the platoon needs to move in the reverse direction, the process 500 may proceed to block 515. If the platoon does not need to move in the reverse direction, which may occur if the platoon is temporarily stopped, if the issue (i.e., the roadway blockage) is cleared, or if the processor 120 determines another path, the process 500 may return to block 505.

At decision block 515, the vehicle platooning system 105 determines whether it should make the rear vehicle the temporary lead vehicle while the platoon is moving in the reverse direction. For instance, the processor 120 may consider whether the rear vehicle has the appropriate sensors, computing, and communication power to act as the temporary lead vehicle. The processor 120 may receive signals from the rear vehicle via, e.g., vehicle-to-vehicle communication about the capabilities of the rear vehicle. If the processor 120 determines that the rear vehicle is equipped to serve as the temporary lead vehicle, the process 500 may proceed to block 520. Otherwise, the process 500 may proceed to block 530.

At block 520, the vehicle platooning system 105 transfers control of the platoon to the rear vehicle. Transferring control of the platoon may include the processor 120 commanding the communication interface 110 to transmit a message to the rear vehicle instructing the rear vehicle to being serving as the temporary lead vehicle.

At decision block 525, the vehicle platooning system 105 determines whether the reverse maneuver is complete. That is, the processor 120 may receive a signal from the rear vehicle (which as discussed above is temporarily serving as the lead vehicle) indicating that the platoon no longer needs to move in the reverse direction. Alternatively, the processor 120 may continually monitor the location of the platoon traveling in the reverse direction and communicate to the rear vehicle via the communication interface 110 that the reverse maneuver is complete. When completed, the process 500 may proceed to block 560. Otherwise, the process 500 may continue to execute block 525 until the reverse maneuver has been completed.

At block 530, the vehicle platooning system 105 commands the rear vehicle to turn around. That is, the processor 120, via the communication interface 110, commands the rear vehicle to face the reverse direction relative to the rest of the vehicles in the platoon. This way, the rear vehicle will be forward facing for the reverse maneuver while all other vehicles in the platoon are traveling in the reverse direction.

At decision block 535, the vehicle platooning system 105 waits for confirmation that the rear vehicle has turned around and is aligned with the platoon. The processor 120 may wait for the confirmation signal, which may be received via the communication interface 110 through vehicle-to-vehicle communication with the rear vehicle. When the confirmation is received, the process 500 may proceed to block 540.

At block 540, the vehicle platooning system 105 receives sensor signals from the rear vehicle. The sensor signals received may be the sensor signals output by the forward facing sensors of the rear vehicle. The processor 120 of the host vehicle 100 may receive the sensor signals via the communication interface 110 and in accordance with a vehicle-to-vehicle communication protocol.

At block 545, the vehicle platooning system 105 controls the platoon in the reverse direction. For instance, the processor 120 may output control signals based on the sensor signals received at block 540. The processor 120 may transmit the control signals to the other vehicles in the platoon via the communication interface 110 and in accordance with a vehicle-to-vehicle communication protocol. The control signals transmitted to the rear vehicle may be different from those transmitted to the other vehicles in the platoon since the rear vehicle is facing a different direction (e.g., the forward direction).

At decision block 550, the vehicle platooning system 105 determines whether the reverse maneuver has been completed. For instance, the processor 120 may continually monitor the location of the platoon traveling in the reverse direction and determine whether the platoon is able to resume operating in the forward direction. When the reverse maneuver has been completed, the process 500 may proceed to block 555. Otherwise, the process 500 may continue to execute block 550 until the reverse maneuver has been completed.

At block 555, the vehicle platooning system 105 commands the rear vehicle to turn around. That is, the processor 120 may transmit, via the communication interface 110, a command that instructs the rear vehicle to face the same direction as the other vehicles in the platoon. The process 500 may proceed to block 560 after the rear vehicle has confirmed that it has turned around and is ready to begin operating in the forward direction with the rest of the platoon.

At block 560, the vehicle platooning system 105 resumes control of the platoon in the forward direction. For example, the processor 120 may begin outputting control signals to the other vehicles in the platoon in accordance with the autonomous driving sensors 115 incorporated into the host vehicle 100.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system, for a lead vehicle, comprising:
a communication interface programmed to communicate with a plurality of platooning vehicles, including the lead vehicle and a rear vehicle, and receive sensor signals transmitted from the rear vehicle, wherein the lead vehicle is first among the plurality of platooning vehicles relative to a first direction of travel and the rear vehicle is last among the plurality of platooning vehicles relative to the first direction of travel; and a processor programmed to command the rear vehicle to turn around to face a second direction of travel and wherein the processor is further programmed to command the rear vehicle to output control signals to the plurality of platooning vehicles, wherein the control signals control at least one of the plurality platooning vehicles to travel in reverse in the second direction of travel according to the sensor signals received from the rear vehicle.

2. The vehicle system of claim 1, wherein the rear vehicle includes forward-facing sensors programmed to output the sensor signals, and wherein the processor is programmed to transmit the control signals in accordance with the sensor signals output by the forward-facing sensors of the rear vehicle.

3. The vehicle system of claim 1, wherein commanding the rear vehicle to turn around to face the second direction of travel includes commanding the rear vehicle to move from a forward facing direction relative to the first direction of travel to a rear facing direction relative to the first direction of travel.

4. The vehicle system of claim 1, wherein controlling at least one of the plurality of platooning vehicles to travel in reverse in the second direction of travel includes commanding the lead vehicle to travel in reverse in the second direction of travel while facing a forward direction relative to the first direction of travel.

5. The vehicle system of claim 1, wherein the processor is programmed to generate the control signals in accordance with a LIDAR sensor incorporated into the rear vehicle.

6. The vehicle system of claim 1, wherein the processor is programmed to generate the control signals in accordance with a RADAR sensor incorporated into the rear vehicle.

7. The vehicle system of claim 1, wherein the processor is programmed to generate the control signals in accordance with an ultrasound sensor incorporated into the rear vehicle.

8. The vehicle system of claim 1, wherein the processor is programmed to generate the control signals in accordance with a camera incorporated into the rear vehicle.

9. A vehicle system, for a lead vehicle, comprising:
autonomous driving sensors;
a communication interface programmed to communicate with a plurality of platooning vehicles, including the lead vehicle and a rear vehicle, and receive sensor signals transmitted from the rear vehicle, wherein the lead vehicle is first among the plurality of platooning vehicles relative to a first direction of travel and the rear vehicle is last among the plurality of platooning vehicles relative to the first direction of travel; and
a processor programmed to command the rear vehicle to turn around to face a second direction of travel and wherein the processor is further programmed to command the rear vehicle to output control signals to the plurality of platooning vehicles, wherein the control signals control at least one of the plurality platooning vehicles to travel in reverse in the second direction of travel according to the sensor signals received from the rear vehicle.

10. The vehicle system of claim 9, wherein the rear vehicle includes forward-facing sensors programmed to output the sensor signals, and wherein the processor is programmed to transmit the control signals in accordance with the sensor signals output by the forward-facing sensors of the rear vehicle.

11. The vehicle system of claim 9, wherein commanding the rear vehicle to turn around to face the second direction of travel includes commanding the rear vehicle to move from a forward facing direction relative to the first direction of travel to a rear facing direction relative to the first direction of travel.

12. The vehicle system of claim 9, wherein controlling at least one of the plurality of platooning vehicles to travel in reverse in the second direction of travel includes commanding the lead vehicle to travel in reverse in the second direction of travel while facing a forward direction relative to the first direction of travel.

13. The vehicle system of claim 9, wherein the processor is programmed to generate the control signals in accordance with at least one of a LIDAR sensor, a RADAR sensor, an ultrasound sensor, and a camera incorporated into the rear vehicle.

14. A method comprising:
determining that at least a lead vehicle in a plurality of vehicles traveling in a platoon in a first direction of travel need to travel in reverse in a second direction of travel, wherein the plurality of vehicles traveling in the platoon further includes a rear vehicle, wherein the lead vehicle is first among the plurality of platooning vehicles relative to the first direction of travel and the rear vehicle is last among the plurality of platooning vehicles relative to the first direction of travel;
commanding a rear vehicle in the platoon to turn around to face a second direction of travel;
receiving sensor signals from the rear vehicle; and
transmitting control signals to the plurality of vehicles in the platoon to travel in reverse in the second direction of travel according to the sensor signals received from the rear vehicle.

15. The method of claim 14, wherein the rear vehicle includes forward-facing sensors programmed to output the sensor signals, and further comprising generating the control signals according to the sensor signals output by the forward-facing sensors of the rear vehicle.

16. The method of claim 15, wherein commanding the rear vehicle to turn around to face the second direction of travel includes commanding the rear vehicle to move from a forward facing direction relative to the first direction of travel to a rear facing direction relative to the first direction of travel.

17. The method of claim 15, wherein controlling at least one of the plurality of platooning vehicles to travel in reverse in the second direction of travel includes commanding the lead vehicle to travel in reverse in the second direction of travel while facing a forward direction relative to the first direction of travel.

* * * * *